United States Patent
Poluboiarinov (10) Patent No.: US 11,964,580 B2
(45) Date of Patent: Apr. 23, 2024

(54) ROBOT DOCKING STATIONS

(71) Applicant: SMP ROBOTICS SYSTEMS CORP., Sausalito, CA (US)

(72) Inventor: Sergei Poluboiarinov, Dubai (AE)

(73) Assignee: SMP Robotics Systems Corp., Sausalito, CA (US)

( * ) Notice: Subject to any disclaimer, the term of this patent is extended or adjusted under 35 U.S.C. 154(b) by 470 days.

(21) Appl. No.: 17/146,969

(22) Filed: Jan. 12, 2021

(65) Prior Publication Data
US 2022/0219557 A1    Jul. 14, 2022

(51) Int. Cl.
| | | |
|---|---|---|
| H02J 7/00 | (2006.01) | |
| B25J 19/00 | (2006.01) | |
| B60L 53/14 | (2019.01) | |
| B60L 53/36 | (2019.01) | |
| B60L 53/62 | (2019.01) | |
| H02J 7/14 | (2006.01) | |
| B60L 53/37 | (2019.01) | |

(52) U.S. Cl.
CPC ............ B60L 53/36 (2019.02); B25J 19/005 (2013.01); B60L 53/14 (2019.02); B60L 53/62 (2019.02); H02J 7/0042 (2013.01); H02J 7/0049 (2020.01); B60L 53/37 (2019.02)

(58) Field of Classification Search
CPC .......... B60L 53/36; B60L 53/62; B60L 53/14; B60L 53/37; B25J 19/005
USPC ........................................................ 320/109
See application file for complete search history.

(56) References Cited

U.S. PATENT DOCUMENTS

| | | | |
|---|---|---|---|
| 5,821,731 A * | 10/1998 | Kuki | H02J 7/0045 |
| | | | 320/108 |
| 8,021,077 B2 | 9/2011 | Annese et al. | |
| D914,779 S | 3/2021 | Polubolarinov | |
| 2010/0141206 A1* | 6/2010 | Agassi | H01M 50/202 |
| | | | 320/109 |
| 2011/0061559 A1* | 3/2011 | Lund | B60L 5/36 |
| | | | 191/29 R |
| 2011/0066515 A1* | 3/2011 | Horvath | B60L 53/36 |
| | | | 705/17 |
| 2013/0226345 A1* | 8/2013 | Zhao | B25J 13/088 |
| | | | 700/258 |

(Continued)

OTHER PUBLICATIONS http://web.archive.org/web/20171001173213/https://smprobotics.com/products_autonomous_ugv/options/.
https://web.archive.org/web/20171001171642/https://smprobotics.com/security_robot/.
https://web.archive.org/web/20190110162913/https://smprobotics.com/.

*Primary Examiner* — Alexis B Pacheco
(74) *Attorney, Agent, or Firm* — Edlavitch Law PLLC (57) ABSTRACT

Robot docking stations and systems and methods thereof can provide for automatic charging of mobile robots. Such stations can include a guide system configured to guide a mobile robot onto or into the station and prevent the robot from moving off or out of the station. The guide system can have zones or position-sensing parts that correspond to walking or rotating parts of a mobile robot (such as legs, wheels, or crawler belts of a robot), and one or more sensors of the station can be configured to sense when the walking or rotating parts of the robot are positioned over, in, or abutting the zones or position-sensing parts of the station. And, an electrical charger assembly of the station can be configured to move into a charging position when the sensor(s) sense that the robot parts are positioned over, in, or abutting the station zones or parts.

20 Claims, 8 Drawing Sheets

(56) References Cited

U.S. PATENT DOCUMENTS

| | | | |
|---|---|---|---|
| 2015/0191094 A1* | 7/2015 | Maekawa | B60L 53/126 |
| | | | 307/104 |
| 2015/0239352 A1* | 8/2015 | Bell | B60L 53/38 |
| | | | 320/108 |
| 2016/0023565 A1* | 1/2016 | Bell | B60L 53/36 |
| | | | 320/108 |
| 2016/0370804 A1* | 12/2016 | Suh | H02J 7/00 |
| 2017/0001524 A1* | 1/2017 | Vahle | B66C 13/12 |
| 2017/0009476 A1* | 1/2017 | Vernon | E04H 6/426 |
| 2017/0327091 A1* | 11/2017 | Capizzo | C25B 9/17 |
| 2019/0181666 A1* | 6/2019 | Hayashi | B60L 53/36 |
| 2020/0021122 A1* | 1/2020 | Lydon | H02J 7/0044 |
| 2020/0133287 A1* | 4/2020 | Wendeborn | G05D 1/0225 |
| 2022/0248923 A1* | 8/2022 | Kim | F16H 19/04 |

* cited by examiner

700 sensing, by a sensor of a robot docking station, when a plurality of wheels of a mobile robot is positioned over a plurality of plates of a horizontal portion of a wheel guide of the station
702 moving, by an electrical charger assembly of the station, into a charging position when the sensor of the station senses the plurality of wheels is positioned over the plurality of plates
704 mating, by the electrical charger assembly, electrical contacts of the electrical charger assembly with an electrical charging port of the mobile robot when the plurality of wheels is positioned over the plurality of plates
706 moving, by the electrical charger assembly, out of the charging position when the mobile robot is charged past a charging threshold
708

FIG. 7

800 sensing, by a sensor of a robot docking station, when a plurality of wheels of a mobile robot is positioned over a plurality of plates of a horizontal portion of a wheel guide of the station
702 moving, by an electrical charger assembly of the station, into a charging position when the sensor of the station senses the plurality of wheels is positioned over the plurality of plates
704 mating, by the electrical charger assembly, electrical contacts of the electrical charger assembly with an electrical charging port of the mobile robot when the plurality of wheels is positioned over the plurality of plates
706 moving, by the electrical charger assembly, out of the charging position when the sensor or a second sensor of the station senses the plurality of wheels moving off of the plurality of plates
802

ROBOT DOCKING STATIONS

TECHNICAL FIELD

The present disclosure relates to robot docking stations. For example, the present disclosure relates to docking stations for mobile robots with wheels.

BACKGROUND

Robot docking stations and mechanisms for automated charging of robots are well known and have existed for many years. However, there continues to be a need for improving mechanical and electrical components of such stations and mechanisms, especially when stations and mechanisms automatically charge robots that swarm in different outdoor and indoor environments. One example technical improvement that may be often overlooked is the reduction in the costs and complexities of building and operating stations and mechanisms for automated charging of mobile robots.

SUMMARY

Described herein are improved robot docking stations as well as systems and methods thereof. Some embodiments of the stations can include a guide system configured to guide a robot onto the station and prevent the robot from moving off the station when the robot is moving onto the station. The guide system can have zones that correspond to wheels or other objects of a mobile robot that allow the robot to move over the ground, such as legs or crawler belts. One or more sensors of the station are configured to sense when the robot has moved to a position over, in, or abutting the zones. One or more sensors of the robot can also be configured to sense when the robot has moved to a position over, in, or abutting the zones. And after detection of such a position, the robot can be automatically stopped for charging. The station can include an electrical charger assembly that is configured to move into a charging position to connect with the robot for charging the robot when the sensor(s) sense that the robot is positioned over, in, or abutting the zones.

In some embodiments, a mobile robot, making a straight-line movement, drives its wheels into sensitive areas, or the aforesaid zones. Such sensitive areas can include contact plates for charging the robot, and as soon as the robot reaches a position of contact (or best contact) between the charging contact plates and a bottom charging contact part of the robot, the robot can automatically stop. At this point, extending and/or sliding charging contacts of the automatic charger station can connect or mate with the charging contacts of the robot and the robot stops. The connecting can occur and be finalized via a magnet positioned proximate to the station's charging contact plate. And, the robot can include a magnetic field sensor mounted on the bottom of the robot near its contact to sense the magnet and identify when to stop. When these last two components interact and the sensor identifies the magnetic field, the robot automatically stops. Also, as soon as all sensitive areas, or the aforesaid zones, are under pressure from the wheels of the robot, the station can extend and/or slide its electrically conductive contacts into place for charging the robot via the robot's charging contacts.

The electrical charger assembly of the station can be configured to connect with an electrical charging port of the robot, when the wheels or objects of the robot are positioned over, in, or abutting the zones. After connecting to the electrical charger assembly, the robot can be charged by the station. Also, the electrical charger assembly is configured to move out of the charging position when the robot is charged past a charging threshold (such as when the robot is fully charged) or when the sensor(s) sense that the robot is moving away from the zones. The electrical charger assembly can move in and out of the charging position and protection parts of the station can protect the charger assembly from dirt and wear and tear when the charger assembly is not charging the robot and out of the charging position. In some embodiments, the protection parts can also protect the charger assembly when it is in of the charging position and moving to and from the charging position.

Some embodiments include a robot docking station having a wheel guide system with plates positioned to correspond to wheels of a mobile robot. A sensor of the station is configured to sense when the wheels of the robot are positioned over the plates, and an electrical charger assembly of the station is configured to move into a charging position when the sensor senses that the wheels of the robot are positioned over the plates. The sensor can be a pressure sensor that detects when pressure or weight is being applied on the plates by the robot. The electrical charger assembly is configured to mate with an electrical charging port of the robot (such as a charging port on the bottom of the robot), when the wheels of the robot are positioned over the plates. After the mating, the robot can be charged by the station. Also, the electrical charger assembly is configured to move out of the charging position when the robot is charged past a charging threshold, such as when the robot is fully charged, or when the sensor or a second sensor of the station senses that the wheels of the robot are moving off of the plates. The electrical charger assembly can move in and out of a housing of the station and the housing can have a movable plate that protects the charger assembly from dirt and wear and tear when the charger assembly is not charging the robot. The sensor and the second sensor can be pressure sensors that detect when pressure or weight is being applied on the plates by the robot or being applied on other areas on the station proximate to the plates by the robot.

Some embodiments include a system having a mobile robot and a robot docking station. The robot can include a sensor to detect when it is in a charging position over the station. The detection by the sensor of the robot can automatically stop the robot for charging purposes. The sensor of the robot can include a magnetic field sensor that can sense a magnetic field emitted from a magnet of the station. Once the magnetic field is sensed past a threshold by the robot's sensor, the robot can be automatically stopped for charging. The robot can also have an electrical charging port and a plurality of wheels configured to move the robot. In some embodiments, the robot can have other types of objects configured to move the robot—such as legs or crawler belts.

In the system, the robot docking station can have a wheel guide system or a guide system for other types of objects configured to move the robot. The guide system can include a horizontal portion having zones or plates. The zones or plates can be positioned to correspond to the plurality of wheels of the mobile robot or other types of objects configured to move the robot. One or more sensors of the station can be configured to sense when the wheels or other types of objects are positioned over, in, or abutting the zones or plates. The station can also include an electrical charger assembly having electrical contacts and configured to: move into a charging position when the sensor(s) sense the wheels or the other types of objects of the robot are positioned over, in, or abutting the zones or plates. The electrical contacts of the docking station can connect or mate to electrical contacts of the electrical charging port of the mobile robot when the wheels or other types of objects of the robot are positioned over, in, or abutting the zones or plates.

Some embodiments include methods of a robot docking station and/or a corresponding mobile robot. One of the methods can include sensing, by one or more sensors of a robot docking station, when wheels of a mobile robot or other objects of a mobile robot that allow the robot to move over the ground, such as legs or crawler belts, are positioned over, in, or abutting zones or plates of a horizontal portion of a guide of the station. The zones or plates can be located to correspond to the wheels or the objects of the mobile robot. Such a method can also include moving, by an electrical charger assembly of the station, into a charging position when the sensor(s) of the station sense the wheels or the objects of the robot are positioned over, in, or abutting the zones or plates. The method can also include connecting or more specifically mating, by the electrical charger assembly, electrical contacts of the electrical charger assembly with an electrical charging port of the mobile robot when the wheels or the other objects of the robot are positioned over, in, or abutting the zones or plates. The method can also include moving, by the electrical charger assembly, out of the charging position when the mobile robot is charged past a charging threshold or when the sensor(s) of the station sense the wheels, or the other objects of the robot, are moving away or off the zones or plates. The sensor(s) can include pressure sensors that detect when pressure or weight is being applied on the zones or plates by the robot or when pressure or weight is being applied on other areas on the station proximate to the plates by the robot.

These and other important aspects of the invention are described more fully in the detailed description below. The invention is not limited to the particular assemblies, apparatuses, methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications and equivalents as will become apparent from consideration of the following detailed description and other parts of this disclosure.

Figure 6:
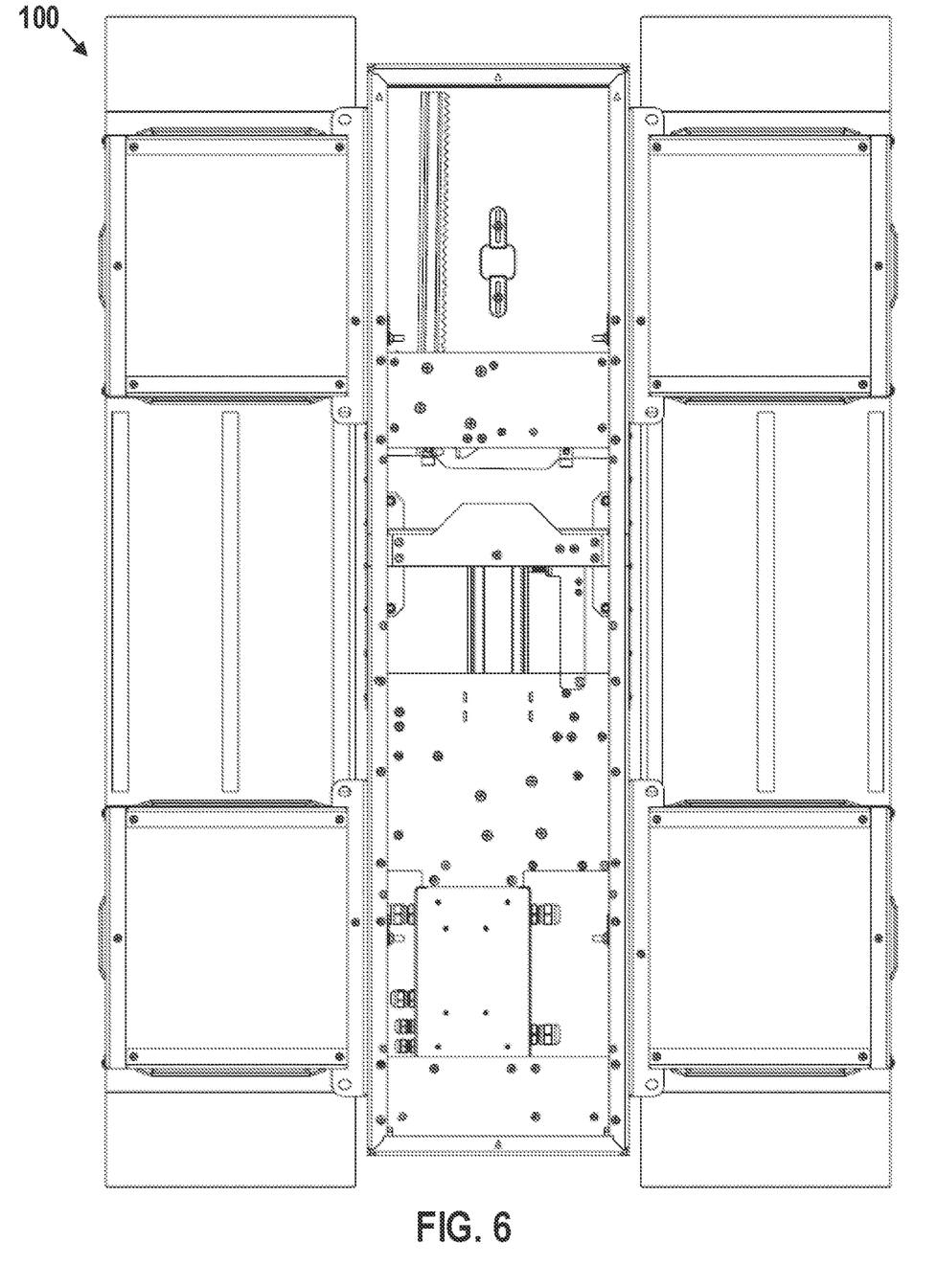
FIG. 6 illustrates a bottom view of the robot docking station shown in FIG. 1, in accordance with some embodiments of the present disclosure.
Figure 7:
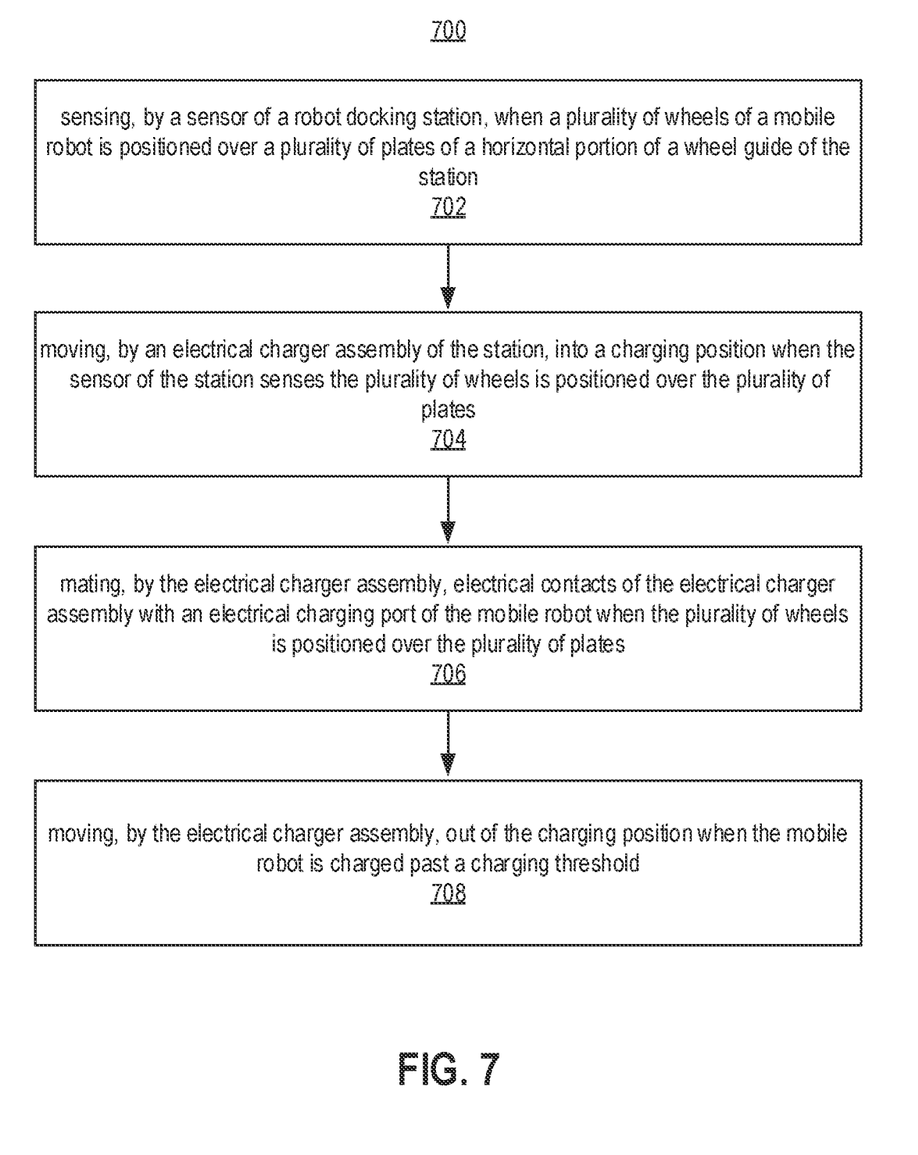
FIGS. 7 and 8 illustrate methods for operating example robot docking stations, in accordance with some embodiments of the present disclosure.
Figure 8:
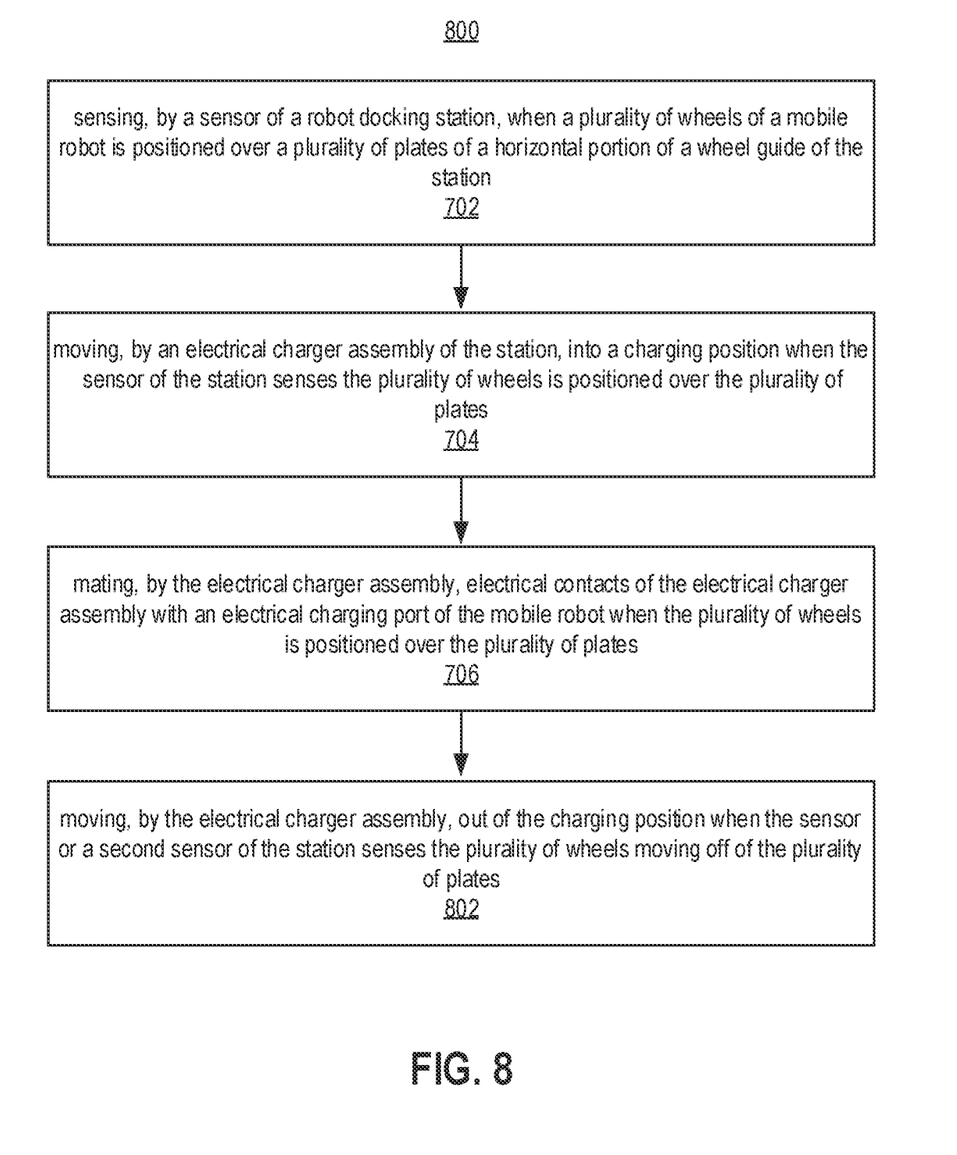

Described herein are robot docking stations (e.g., see robot docking station 100 shown in FIGS. 1 to 6) as well as systems having such stations (e.g., see system 900 shown in FIG. 9) and methods using such stations (e.g., see methods 700 and 800 shown in FIGS. 7 and 8, respectively). Some embodiments of the stations can include a guide system configured to guide a robot onto the station and prevent the robot from moving off the station when the robot is moving onto the station. The guide system can have zones (e.g., see plates 102a, 102b, 102c, and 102d depicted in FIGS. 1 and 5) that correspond to wheels or other objects of a mobile robot that allow the robot to move over the ground, such as legs or crawler belts. One or more sensors of the station are configured to sense when the wheels, or the other objects of a mobile robot that allow the robot to move over the ground, are positioned over, in, or abutting the zones. And, an electrical charger assembly of the station (e.g., see electrical charger assembly 104) is configured to move into a charging position when the sensor(s) sense that the wheels or objects of the robot are positioned over, in, or abutting the zones. The electrical charger assembly is configured to connect with an electrical charging port of the robot, when the wheels or objects of the robot are positioned over, in, or abutting the zones. After connecting to the electrical charger assembly, the robot can be charged by the station. Also, the electrical charger assembly is configured to move out of the charging position when the robot is charged past a charging threshold, such as when the robot is fully charged, or when the sensor(s) sense that the robot is moving away from the zones. The electrical charger assembly can move in and out of the charging position and protection parts of the station can protect the charger assembly from dirt and wear and tear when the charger assembly is not charging the robot (e.g., see movable plate 120 shown in FIG. 1). In some embodiments, the protection parts can also protect the charger assembly when it is in the charging position or moving to and from the charging position.

Some embodiments include a robot docking station having a wheel guide system with plates positioned to correspond to wheels of a mobile robot (e.g., see robot docking station 100 and plates 102a, 102b, 102c, and 102d). A sensor of the station is configured to sense when the wheels of the robot are positioned over the plates, and an electrical charger assembly of the station is configured to move into a charging position when the sensor senses that the wheels of the robot are positioned over the plates (e.g., see electrical charger assembly 104). The electrical charger assembly is configured to mate with an electrical charging port of the robot (such as a charging port on the bottom of the robot), when the wheels of the robot are positioned over the plates. After the mating, the robot can be charged by the station. Also, the electrical charger assembly is configured to move out of the charging position when the robot is charged past a charging threshold, such as when the robot is fully charged, or when the sensor or a second sensor of the station senses that the wheels of the robot are moving off of the plates. The electrical charger assembly can move in and out of a housing of the station that has a movable plate that protects the charger assembly from dirt and wear and tear when the charger assembly is not charging the robot (e.g., see charger housing 118 and movable plate 120 shown in FIGS. 1 and 5).

Figure 9:
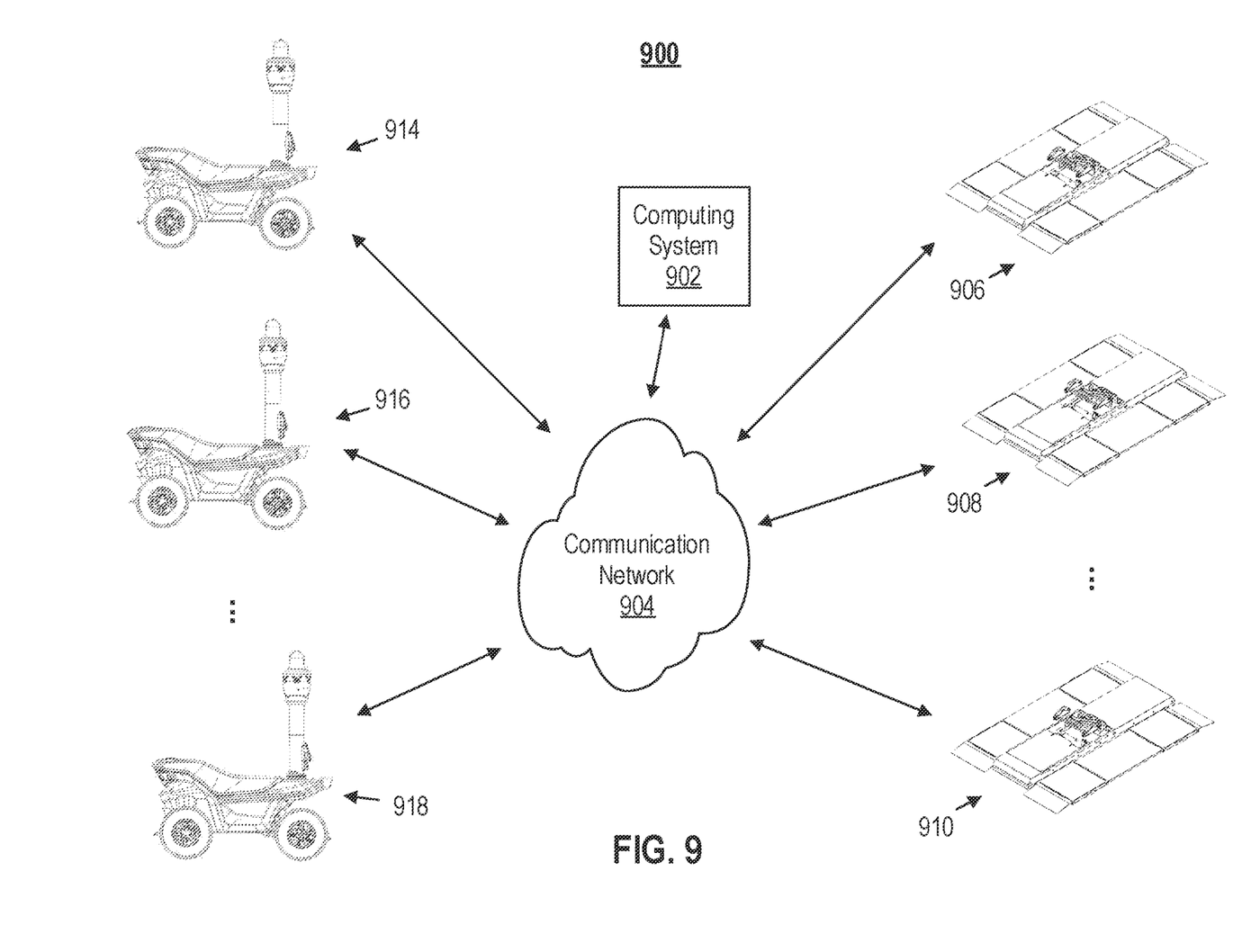
FIG. 9 illustrates a system having a computing system, multiple robot docking stations and multiple corresponding mobile robots communicating over a communication network, in accordance with some embodiments of the present disclosure.

Some embodiments include a system having a mobile robot and a robot docking station (e.g., see system 900 shown in FIG. 9 as well as robots 914, 916, and 918 and docking stations 906, 908, and 910). The robot can have an electrical charging port and a plurality of wheels configured to move the robot or other types of objects configured to move the robot such as legs or crawler belts. The robot docking station can have a wheel guide system or a guide system for other types of objects configured to move the robot. The guide system can include a horizontal portion having zones or plates. The zones or plates can be positioned to correspond to the plurality of wheels of the mobile robot or other types of objects configured to move the robot. One or more sensors of the station can be configured to sense when the wheels or other types of objects are positioned over, in, or abutting the zones or plates. The station can also include an electrical charger assembly having electrical contacts and configured to: move into a charging position when the sensor(s) sense the wheels or the other types of objects of the robot are positioned over, in, or abutting the zones or plates. The electrical contacts of the docking station can connect or mate to electrical contacts of the electrical charging port of the mobile robot when the wheels or other types of objects of the robot are positioned over, in, or abutting the zones or plates.

Some embodiments include methods of a robot docking station and/or a corresponding mobile robot (e.g., see methods 700 and 800 shown in FIGS. 7 and 8, respectively). One of the methods can include sensing, by one or more sensors of a robot docking station, when wheels of a mobile robot or other objects of a mobile robot that allow the robot to move over the ground, such as legs or crawler belts, are positioned over, in, or abutting zones or plates of a horizontal portion of a guide of the station (e.g., see step 702 shown in FIGS. 7 and 8). The zones or plates can be located to correspond to the wheels or the objects of the mobile robot. Such a method can also include moving, by an electrical charger assembly of the station, into a charging position when the sensor(s) of the station sense the wheels or the objects of the robot are positioned over, in, or abutting the zones or plates (e.g., see step 704 shown in FIGS. 7 and 8). The method can also include connecting or more specifically mating, by the electrical charger assembly, electrical contacts of the electrical charger assembly with an electrical charging port of the mobile robot when the wheels or the other objects of the robot are positioned over, in, or abutting the zones or plates (e.g., see step 706 shown in FIGS. 7 and 8). The method can also include moving, by the electrical charger assembly, out of the charging position when the mobile robot is charged past a charging threshold (e.g., see step 708 shown in FIG. 7) or when the sensor(s) of the station sense the wheels, or the other objects of the robot, are moving away or off the zones or plates (e.g., see step 802 shown in FIG. 8).

Figure 1:
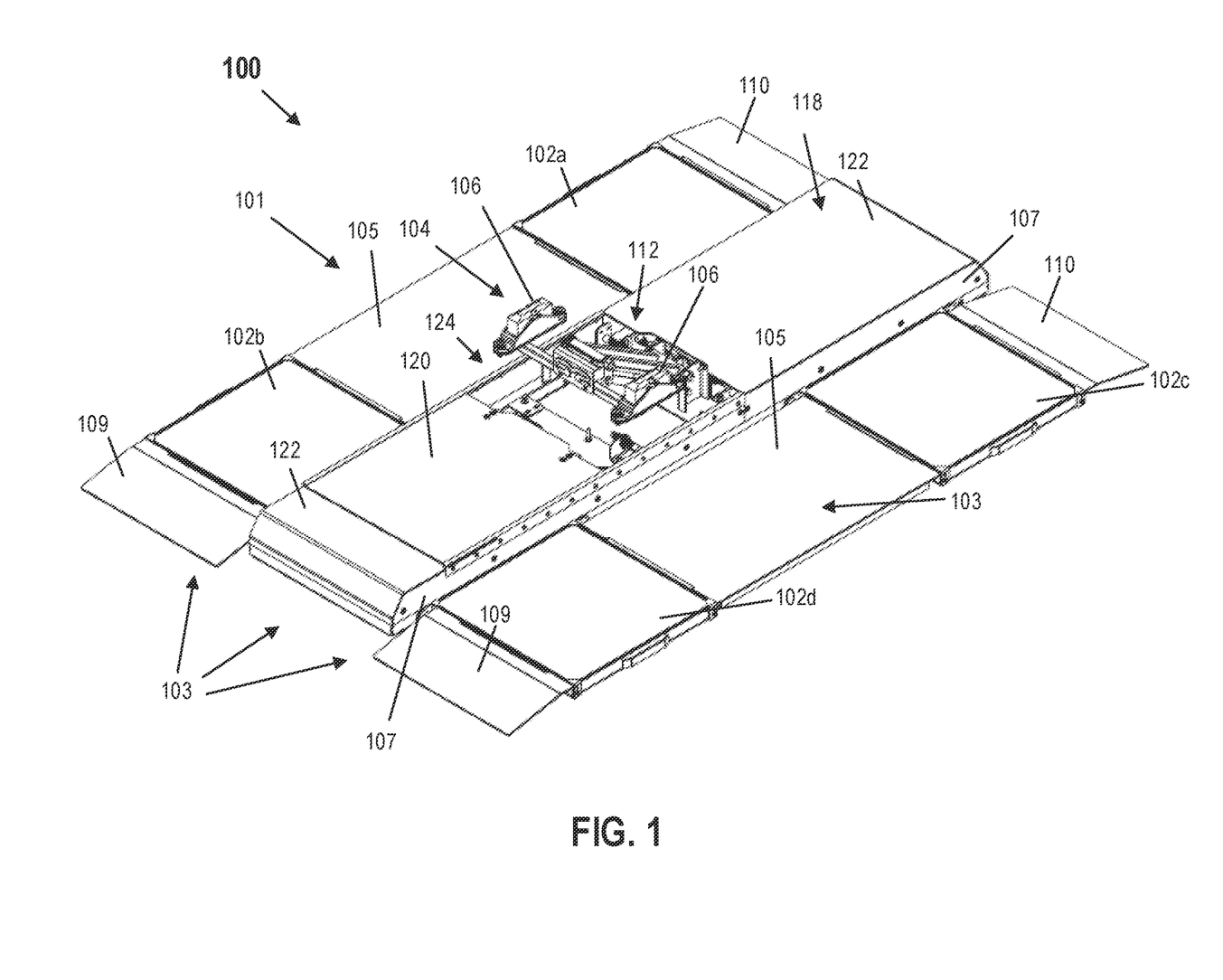
FIG. 1 illustrates a top perspective view of a robot docking station, in accordance with some embodiments of the present disclosure.
Figure 2:
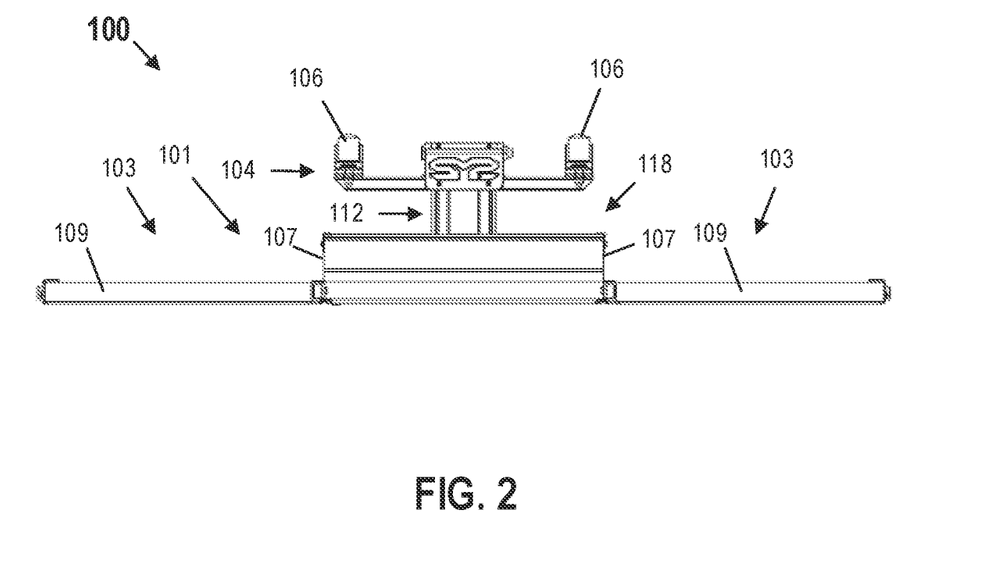
FIG. 2 illustrates a front view of the robot docking station shown in FIG. 1, in accordance with some embodiments of the present disclosure.
Figure 3:
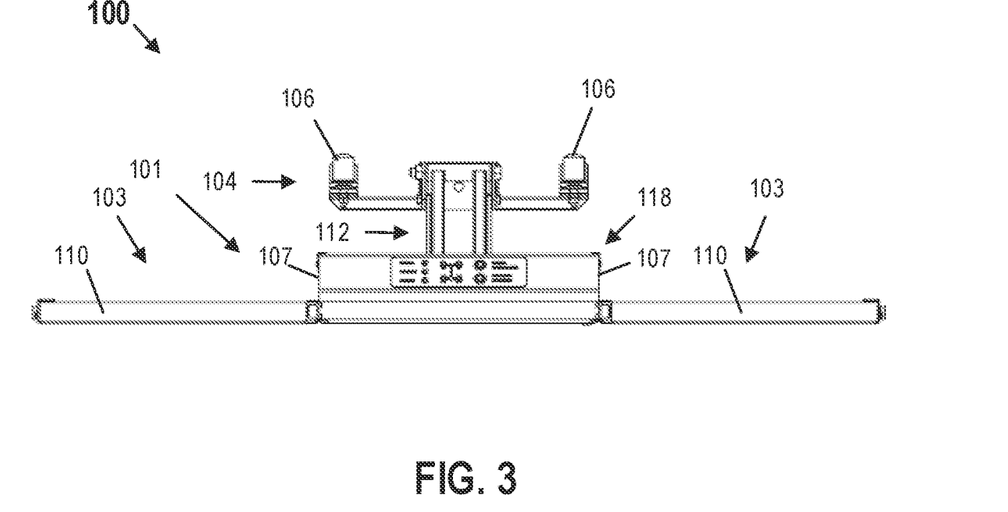
FIG. 3 illustrates a rear view of the robot docking station shown in FIG. 1, in accordance with some embodiments of the present disclosure.
Figure 4:
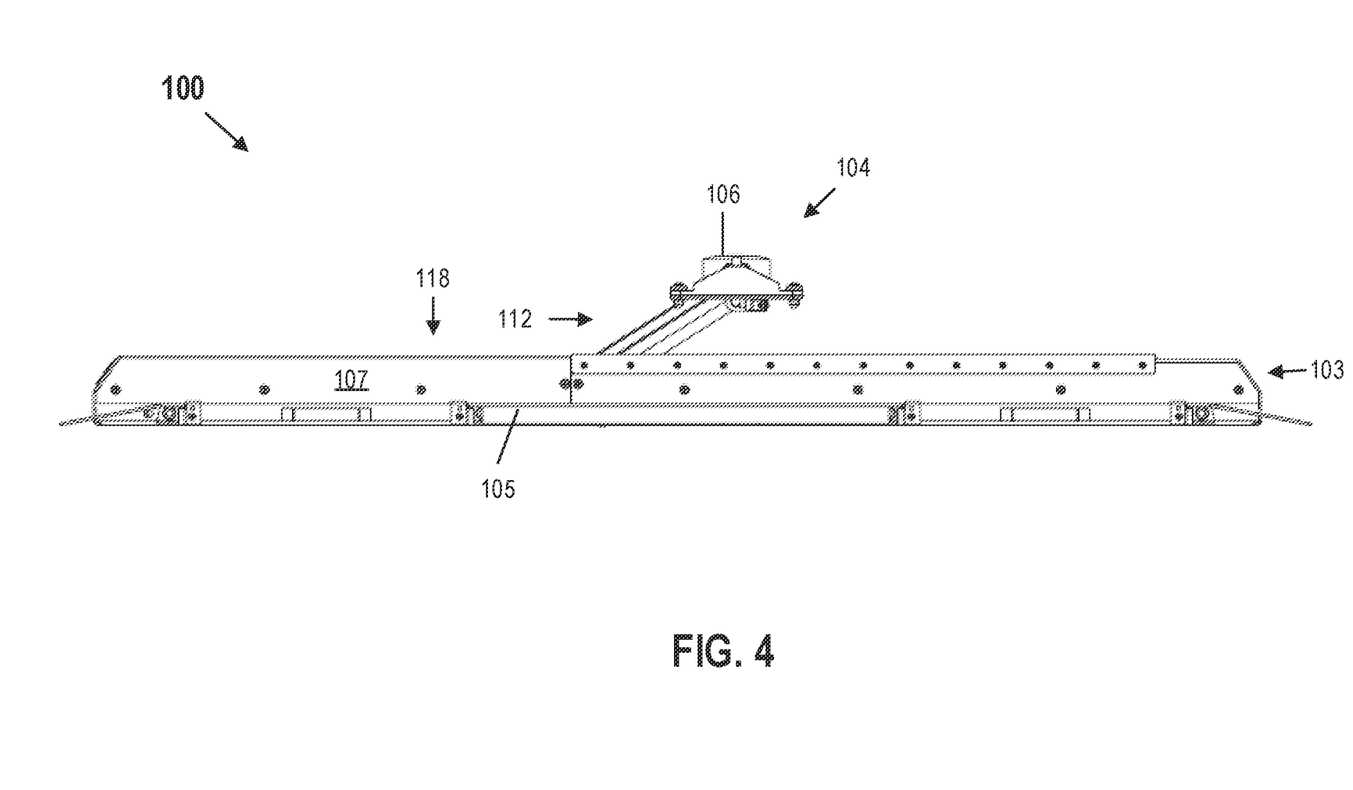
FIG. 4 illustrates a side view of the robot docking station shown in FIG. 1, in accordance with some embodiments of the present disclosure.
Figure 5:
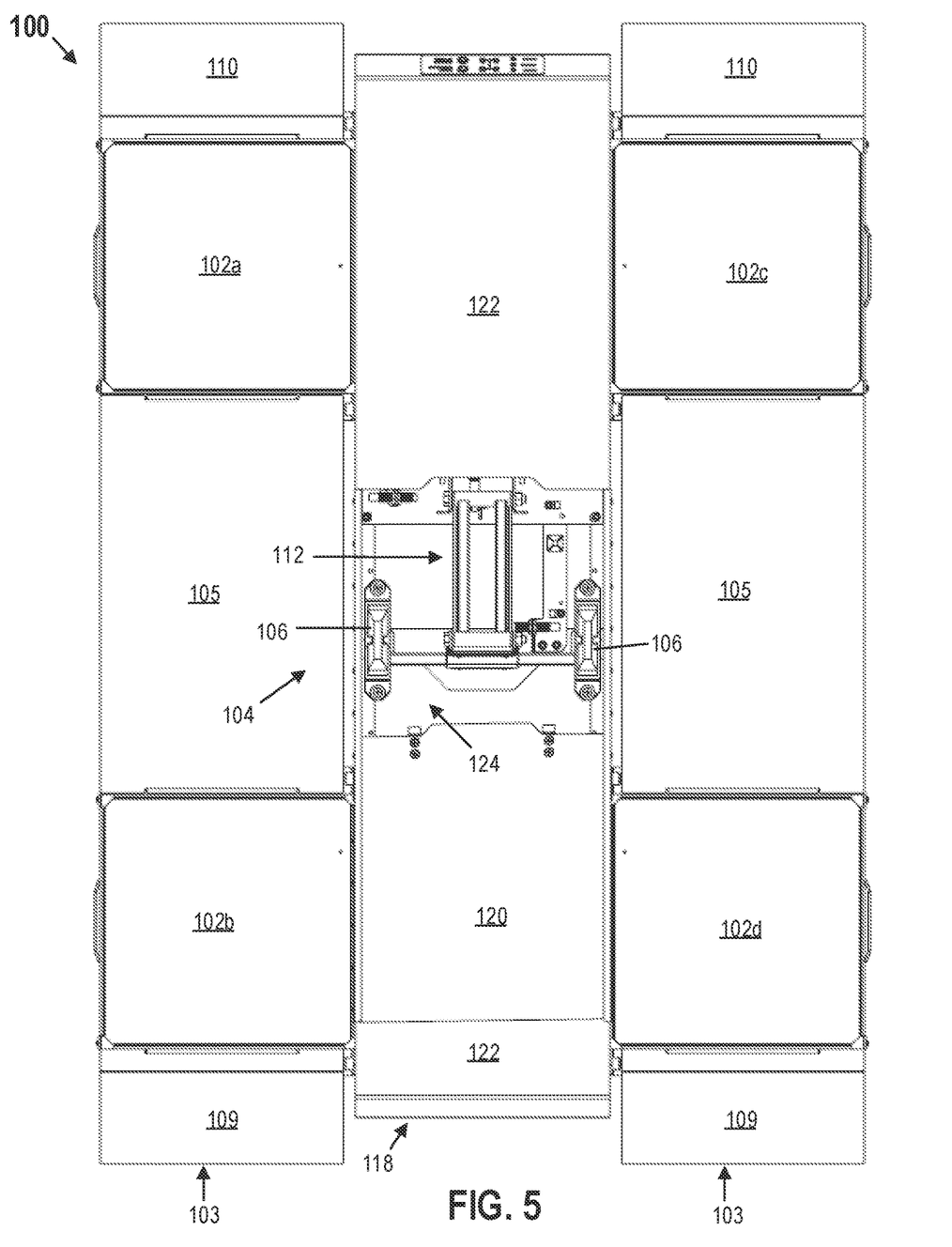
FIG. 5 illustrates a top view of the robot docking station shown in FIG. 1, in accordance with some embodiments of the present disclosure.

Specifically, FIG. 1 illustrates a top perspective view of robot docking station 100 while its electrical charger assembly 104 is in a charging position. FIG. 2 illustrates a front view of the robot docking station 100 while its electrical charger assembly 104 is in the charging position. FIG. 3 illustrates a rear view of the robot docking station 100 while its electrical charger assembly 104 is in the charging position. FIG. 4 illustrates a side view of the robot docking station 100 while its electrical charger assembly 104 is in the charging position. Whereas, FIG. 5 illustrates a top view of the robot docking station 100 in general. And, FIG. 6 illustrates a bottom view of the robot docking station 100 in general.

As shown in these figures, the robot docking station 100 is an apparatus having robot docking station frame 101. The robot docking station 100 includes a wheel guide system 103 attached to the robot docking station frame 101, having horizontal portions 105 having plates 102*a*, 102*b*, 102*c*, and 102*d*. The plates 102*a*, 102*b*, 102*c*, and 102*d* are positioned to correspond to wheels of a mobile robot. Not depicted, at least one sensor can be configured to sense when a plurality of wheels of a mobile robot is positioned over the plates 102*a*, 102*b*, 102*c*, and 102*d*. Also, although four plates are shown in FIGS. 1 and 5 (e.g., see plates 102*a* to 102*d*), it is to be understood that less or more plates can be a part of a wheel guide system of a robot docking station in some embodiments. The number of plates can depend on the number of wheels, legs, or crawler belts corresponding robots use to move themselves. The sensor(s) can be pressure sensors that detect when pressure or weight is being applied on the plates by the robot or when pressure or weight is being applied to other areas on the station proximate to the plates by the robot. The sensor(s) can also be optical or infrared motion detectors that detect a robot's location relative to the plates. The sensor(s) can also be magnetic field sensors that detect a magnetic field outputted by a magnet on or in the robot. The robot can be configured to stop by sensing a magnetic field emitted from the station and sensed by the robot when the robot is in the best position to connect with the charging station.

The robot docking station 100 also includes an electrical charger assembly 104 having electrical contacts 106. The electrical charger assembly 104 is configured to move into a charging position when the sensor senses wheels of a mobile robot are positioned over the plates 102*a*, 102*b*, 102*c*, and 102*d*. The electrical charger assembly 104 is also configured to mate the electrical contacts 106 with an electrical charging port of a mobile robot when wheels of the robot are positioned over the plates 102*a*, 102*b*, 102*c*, and 102*d*. The electrical charger assembly 104 can also be configured to move out of the charging position when a mobile robot is charged past a charging threshold. The electrical charger assembly 104 can also be configured to move out of the charging position when a mobile robot is charged fully. The electrical charger assembly 104 can also be configured to move out of the charging position when the sensor or a second sensor of the robot docking station 100 senses wheels of a mobile robot moving off of the plates 102*a*, 102*b*, 102*c*, and 102*d*.

In some embodiments, a mobile robot, making a straight-line movement, drives its wheels on the plates 102*a*, 102*b*, 102*c*, and 102*d*. In between the plates is where the electrical charger assembly 104 extends its electrical contacts to connect with the electrical contacts on the bottom of a robot. The connection can occur as soon as the robot reaches a position of contact (or best contact) between the charging contact plates and a bottom charging contact part of the robot. At such a position or moment, the robot can automatically stop. The moving or sliding and extending charging contacts of the automatic charger station can connect or mate with the charging contacts of the robot and the robot stops. The precise positioning of the robot over the station for the charging connection can occur via a magnet positioned proximate to the station's charging contact plate or the electrical charger assembly 104. And, the robot can include a magnetic field sensor mounted on the bottom of the robot near its electrical charging contact to sense a magnet field emitted from the magnet of the station. Using the magnetic field sensor, the robot can identify when to stop. When these last two components interact, such as interact optimally, (i.e., the magnet and the magnetic field sensor interact optimally or the field is sensed to exceed a threshold), the robot automatically stops. Also, as soon as the plates 102a, 102b, 102c, and 102d are under pressure from the wheels of the robot, the station can extend its electrically conductive contacts which provide electrical connection to the contacts located on the bottom of the robot and thus charge the robot stopped by interactions between the station's magnet and robot's magnetic field sensor.

The wheel guide system 103 includes lateral guide rails 107 arranged lateral to the horizontal portions 105 of the station and configured to prevent wheels of a mobile robot from moving sideways off the horizontal portions 105 once at least some of the wheels have moved onto the horizontal portion. As shown in FIGS. 1 to 4, the lateral guide rails 107 are sidewalls of the charger housing 118 that holds the electrical charger assembly 104 when the charger assembly is not charging a robot.

As shown in FIGS. 1, 2, 3, and 5, the wheel guide system 103 includes a bridge structure, having the horizontal portions 105, on-ramps 109 at respective front ends of the horizontal portions, and off-ramps 110 at respective rear ends of the horizontal portions. The robot docking station 100 and the robot docking station frame 101 includes the charger housing 118. The charger housing 118 is configured to cover and hold the electrical charger assembly 104 and includes a top wall 122, an opening 124 in the top wall and the movable plate 120. The movable plate 120 is configured to move away from the opening 124 horizontally, by a plate actuator (not depicted), when a sensor of the station senses that wheels of a mobile robot are positioned over the plates 102a, 102b, 102c, and 102d. The movable plate 120 is also configured to move over the opening 124, by the plate actuator, when the sensor or a second sensor of the robot docking station 100 senses that wheels of a mobile robot are moving off of the plates 102a, 102b, 102c, and 102d.

As shown in FIGS. 1 to 5, the electrical charger assembly 104 has a vertical actuating part 112 configured to move the electrical contacts 106 of the charger assembly out of the charger housing 118 upwardly through the opening 124, when a sensor of the station senses that wheels of a mobile robot are positioned over the plates 102a, 102b, 102c, and 102d. The vertical actuating part 112 is also configured to move the electrical contacts 106 into the charger housing 118 downwardly through the opening 124, when the sensor or the second sensor of the station senses that wheels of a mobile robot are moving off of the plates 102a, 102b, 102c, and 102d.

As mentioned, and as shown in FIGS. 1 to 4, the charger housing 118 includes side walls (i.e., the lateral guide rails 107) arranged to prevent wheels of a mobile robot from moving sideways over the top wall 122 of the housing once at least some of the wheels have moved onto the horizontal portions 105 of the wheel guide system 103.

FIGS. 7 and 8 illustrate methods 700 and 800 respectively, which are methods of operation of example robot docking stations. Both methods 700 and 800 start at step 702 with sensing, by a sensor of a robot docking station, when wheels of a mobile robot are positioned over plates of a horizontal portion of a wheel guide of the station. The plates are located to correspond to the wheels of the robot.

At step 704, both methods 700 and 800 continue with moving, by an electrical charger assembly of the station, into a charging position when the sensor of the station senses the wheels are positioned over the plates. In some embodiments, at step 704, a movable plate of the charger housing moves away from an opening in the housing horizontally, by a plate actuator, when the sensor senses that wheels of a mobile robot are positioned over the plates. The movable plate moves away from the opening prior to the charger assembly moving into the charging position.

At step 706, both methods 700 and 800 continue with mating, by the electrical charger assembly, electrical contacts of the electrical charger assembly with an electrical charging port of the mobile robot. This also occurs when the wheels are positioned over the plates. In some embodiments, at step 706, a vertical actuating part moves the electrical contacts of the charger assembly out of the charger housing upwardly through the opening an into the electrical contacts of the robot, when the sensor senses that the wheels of a mobile robot are positioned over the plates.

As shown in FIG. 7, at step 708, method 700 continues with moving, by the electrical charger assembly, out of the charging position when the mobile robot is charged past a charging threshold. In some embodiments, the electrical charger assembly moves out of the charging position when a mobile robot is charged fully. In some embodiments, at step 708, a movable plate of the charger housing moves over an opening of the charger housing, by the plate actuator, when the mobile robot is charged past a charging threshold. In such embodiments, prior to the closing of the housing, at step 708, the vertical actuating part moves the electrical contacts into the charger housing downwardly through the opening. This can also occur as soon as when the mobile robot is charged past a charging threshold.

As shown in FIG. 8, at step 802, method 800 continues with moving, by the electrical charger assembly, out of the charging position when the sensor or a second sensor of the station senses the wheels moving off of the plates. At 802, in some embodiments, a movable plate of the charger housing moves over an opening of the charger housing, by the plate actuator, when the sensor or a second sensor of the station senses the wheels moving off of the plates. In some embodiments, prior to the closing of the housing, at step 802, the vertical actuating part can move the electrical contacts into the charger housing downwardly through the opening. This can also occur as soon as when the sensor or a second sensor of the station senses the wheels moving off of the plates.

FIG. 9 illustrates a system 900 having a computing system 902, multiple robot docking stations and multiple corresponding mobile robots communicating over a communication network 904, in accordance with some embodiments of the present disclosure. System 900 includes at least one computing system (e.g., see computing system 902), a communication network 904, robot docking stations (e.g., see robot docking stations 906, 908, and 910) and mobile robots (e.g., see mobile robots 914, 916, and 918). The docking stations and the robots are shown communicating with computing system 902 and with each other through the communication network 904. Not shown in FIG. 9, the docking stations and robots of the system 900 can each include its own computing system. Such computing systems can include a processor, memory, a communication interface and one or more sensors that can make the different devices individual computing devices. In the case of the communication network 904 including the Internet, the devices (e.g., see computing system 902, robot docking stations 906, 908, and 910, and mobile robots 914, 916, and 918) can be considered Internet of Things (IoT) devices.

In the system 900, a mobile robot, such as mobile robot 914, can include an electrical charging port and a plurality of wheels configured to move the robot. Also, in the system 900, a robot docking station, such as robot docking station 906, can include a wheel guide system that has a horizontal portion having a plurality of plates. The plurality of plates can be positioned to correspond to the plurality of wheels of the mobile robot. In the system 900 and in some other embodiments, the plurality of plates includes four plates, and in such embodiments the corresponding robot has four wheels.

The robot docking station can also include a sensor, configured to sense when the plurality of wheels is positioned over the plurality of plates as well as an electrical charger assembly having electrical contacts and being configured to move into a charging position when the sensor senses the plurality of wheels is positioned over the plurality of plates. The charger assembly can also be configured to mate the electrical contacts with the electrical charging port of the mobile robot when the plurality of wheels of the robot is positioned over the plurality of plates. In some embodiments, the electrical charger assembly is configured to move out of the charging position when the mobile robot is charged past a charging threshold. In some other embodiments, the electrical charger assembly is configured to move out of the charging position when the sensor or a second sensor of the docking station senses the plurality of wheels of the mobile robot moving off of the plurality of plates.

In the system 900, the wheel guide system of a docking station can include lateral guide rails arranged lateral to the horizontal portion of the station and configured to prevent the plurality of wheels of the mobile robot from moving sideways off the horizontal portion once at least some of the plurality of wheels have moved onto the horizontal portion. In some embodiments, the wheel guide system can include a bridge structure, having a horizontal portion, an on-ramp at a front end of the horizontal portion, and an off-ramp at a rear end of the horizontal portion.

In the system 900, a robot docking station can include a charger housing, configured to cover and hold the electrical charger assembly and having a top wall and an opening in the top wall. Such a station can also include a movable plate configured to move away from the opening horizontally, by a plate actuator, when the sensor senses the plurality of wheels of the mobile robot is positioned over the plurality of plates as well as move over the opening, by the plate actuator, when the sensor or a second sensor of the robot docking station senses that the plurality of wheels of the mobile robot is moving off of the plurality of plates. In such embodiments of a robot docking station, the electrical charger assembly can include a vertical actuating part configured to move the electrical contacts of the charger assembly out of the charger housing upwardly through the opening, when the sensor senses the plurality of wheels of the mobile robot is positioned over the plurality of plates. And, the vertical actuating part can also be configured to move the electrical contacts into the charger housing downwardly through the opening, when the sensor or the second sensor senses the plurality of wheels of the mobile robot is moving off of the plurality of plates.

In system 900, a robot docking station can also include a charger housing and the housing can include side walls arranged to prevent the plurality of wheels of the mobile robot from moving sideways over the top wall of the housing once at least part of the plurality of wheels has moved onto the horizontal portion of the wheel guide system.

The communication network 904 can include one or more local area networks (LAN(s)) and/or one or more wide area networks (WAN(s)). The communication network 904 can include the Internet and/or any other type of interconnected communications network. The communication network 904 can also include a single computer network or a telecommunications network. More specifically, the communication network 904 can include a local area network (LAN) such as a private computer network that connects computers in small physical areas, a wide area network (WAN) to connect computers located in different geographical locations, and/or a middle area network (MAN) to connect computers in a geographic area larger than that covered by a large LAN but smaller than the area covered by a WAN.

At least each shown component of the system 900 (including computing system 902, communication network 904, robot docking stations 906, 908, and 910, and mobile robots 914, 916, and 918) can be or include a computing system which can include memory that can include media. The media can include or be volatile memory components, non-volatile memory components, or a combination of thereof. In general, each of the computing systems can include a host system that uses memory. For example, the host system can write data to the memory and read data from the memory. The host system can be a computing device that includes a memory and a data processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. An apparatus, comprising:
   robot docking station frame;
   a wheel guide system attached to the robot docking station frame, comprising a horizontal portion comprising a plurality of plates, wherein the plurality of plates is positioned to correspond to a plurality of wheels of a mobile robot;
   a sensor, configured to sense when a plurality of wheels of a mobile robot is positioned over the plurality of plates; and
   an electrical charger assembly comprising electrical contacts and configured to:
   move into a charging position when the sensor senses a plurality of wheels of a mobile robot is positioned over the plurality of plates; and mate the electrical contacts with an electrical charging port of a mobile robot when a plurality of wheels of the mobile robot is positioned over the plurality of plates;
a charger housing configured to cover and hold the electrical charger assembly and comprising: a top wall; and an opening in the top wall; and
a movable plate, configured to:
move away from the opening horizontally, by a plate actuator, when the sensor senses that a plurality of wheels of a mobile robot is positioned over the plurality of plates; and
move over the opening, by the plate actuator, when the sensor or a second sensor of the apparatus senses that a plurality of wheels of a mobile robot is moving off of the plurality of plates,
and wherein the electrical charger assembly comprises a vertical actuating part, configured to:
move the electrical contacts of the electrical charger assembly out of the charger housing upwardly through the opening, when the sensor senses a plurality of wheels of a mobile robot is positioned over the plurality of plates; and
move the electrical contacts into the charger housing downwardly through the opening, when the sensor or the second sensor senses a plurality of wheels of a mobile robot is moving off of the plurality of plates.

2. The apparatus of claim 1, wherein the electrical charger assembly is configured to move out of the charging position when a mobile robot is charged past a charging threshold.

3. The apparatus of claim 2, wherein the electrical charger assembly is configured to move out of the charging position when a mobile robot is charged fully.

4. The apparatus of claim 1, wherein the electrical charger assembly is configured to move out of the charging position when the sensor or a second sensor of the apparatus senses a plurality of wheels of a mobile robot moving off of the plurality of plates.

5. The apparatus of claim 1, wherein the wheel guide system comprises lateral guide rails arranged lateral to the horizontal portion and configured to prevent a plurality of wheels of a mobile robot from moving sideways off the horizontal portion, once at least part of the plurality of wheels has moved onto the horizontal portion.

6. The apparatus of claim 1, wherein the wheel guide system comprises a bridge structure, comprising: the horizontal portion, an on-ramp at a front end of the horizontal portion, and an off-ramp at a rear end of the horizontal portion.

7. The apparatus of claim 1, wherein the charger housing comprises side walls arranged to prevent a plurality of wheels of a mobile robot from moving sideways over the top wall of the charger housing, once at least part of the plurality of wheels has moved onto the horizontal portion of the wheel guide system.

8. The apparatus of claim 1, wherein the plurality of plates consists of four plates.

9. The apparatus of claim 1, comprising a mobile robot.

10. The apparatus of claim 9, wherein the mobile robot comprises an electrical charging port.

11. The apparatus of claim 10, wherein the mobile robot comprises a plurality of wheels, configured to move the mobile robot.

12. The apparatus of claim 11, wherein the plurality of plates is positioned to correspond to the plurality of wheels of the mobile robot.

13. The apparatus of claim 12, wherein the sensor is configured to sense when the plurality of wheels is positioned over the plurality of plates.

14. The apparatus of claim 13, wherein the electrical charger assembly is configured to move into the charging position when the sensor senses the plurality of wheels is positioned over the plurality of plates.

15. The apparatus of claim 14, wherein the electrical charger assembly is configured to mate the electrical contacts with the electrical charging port of the mobile robot when the plurality of wheels of the mobile robot is positioned over the plurality of plates.

16. The apparatus of claim 15, wherein the electrical charger assembly is configured to move out of the charging position when the mobile robot is charged past a charging threshold.

17. An apparatus, comprising:
robot docking station frame;
a wheel guide system attached to the robot docking station frame, comprising a horizontal portion comprising a plurality of plates, wherein the plurality of plates is positioned to correspond to a plurality of wheels of a mobile robot;
a pressure sensor, configured to sense when a plurality of wheels of a mobile robot is positioned over the plurality of plates;
an electrical charger assembly comprising electrical contacts and configured to:
move into a charging position when the pressure sensor senses a plurality of wheels of a mobile robot is positioned over the plurality of plates; and
mate the electrical contacts with an electrical charging port of a mobile robot when a plurality of wheels of the mobile robot is positioned over the plurality of plates; and
a charger housing, configured to cover and hold the electrical charger assembly and comprising: a top wall; and an opening in the top wall; and
a movable plate, configured to:
move away from the opening horizontally, by a plate actuator, when the pressure sensor senses that a plurality of wheels of a mobile robot is positioned over the plurality of plates; and
move over the opening, by the plate actuator, when the pressure sensor or a second sensor of the apparatus senses that a plurality of wheels of a mobile robot is moving off of the plurality of plates,
and wherein the electrical charger assembly comprises a vertical actuating part, configured to:
move the electrical contacts of the electrical charger assembly out of the charger housing upwardly through the opening, when the pressure sensor senses a plurality of wheels of a mobile robot is positioned over the plurality of plates; and
move the electrical contacts into the charger housing downwardly through the opening, when the pressure sensor or the second sensor senses a plurality of wheels of a mobile robot is moving off of the plurality of plates.

18. An apparatus, comprising:
robot docking station frame;
a wheel guide system attached to the robot docking station frame, comprising a horizontal portion comprising a plurality of plates, wherein the plurality of plates is positioned to correspond to a plurality of wheels of a mobile robot;

a pressure sensor, configured to sense when a plurality of wheels of a mobile robot is positioned over the plurality of plates by detecting when pressure or weight is being applied on the plurality of plates by the mobile robot;

an electrical charger assembly comprising electrical contacts and configured to:
  move into a charging position when the pressure sensor senses a plurality of wheels of a mobile robot is positioned over the plurality of plates; and
  mate the electrical contacts with an electrical charging port of a mobile robot when a plurality of wheels of the mobile robot is positioned over the plurality of plates; and a charger housing configured to cover and hold the electrical charger assembly and comprising: a top wall; and an opening in the top wall; and a movable plate, configured to:
  move away from the opening horizontally, by a plate actuator, when the pressure sensor senses that a plurality of wheels of a mobile robot is positioned over the plurality of plates; and
  move over the opening, by the plate actuator, when the pressure sensor or a second sensor of the apparatus senses that a plurality of wheels of a mobile robot is moving off of the plurality of plates, and wherein the electrical charger assembly comprises a vertical actuating part configured to:
  move the electrical contacts of the electrical charger assembly out of the charger housing upwardly through the opening, when the pressure sensor senses a plurality of wheels of a mobile robot is positioned over the plurality of plates; and
  move the electrical contacts into the charger housing downwardly through the opening, when the pressure sensor or the second sensor senses a plurality of wheels of a mobile robot is moving off of the plurality of plates.

19. The apparatus of claim 18, wherein the electrical charger assembly is configured to move out of the charging position when a mobile robot is charged past a charging threshold.

20. The apparatus of claim 19, wherein the electrical charger assembly is configured to move out of the charging position when a mobile robot is charged fully.

* * * * *